UNITED STATES PATENT OFFICE 2,242,562

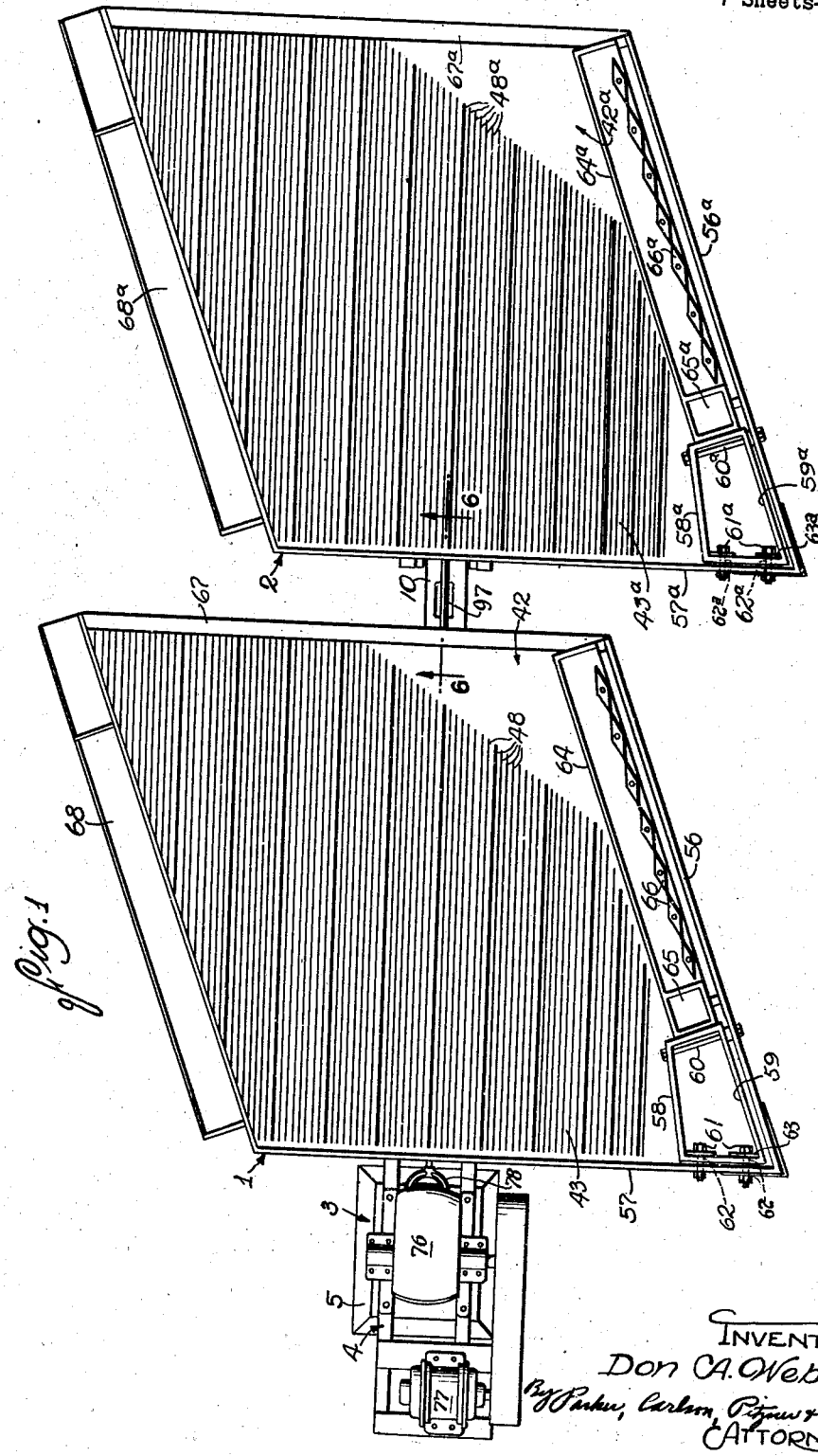

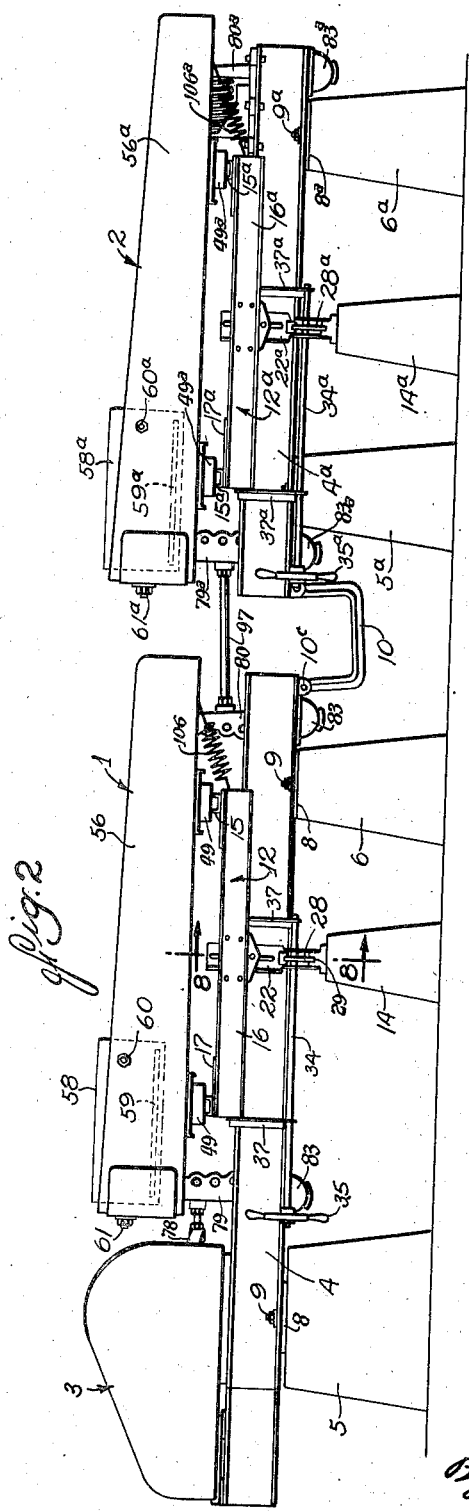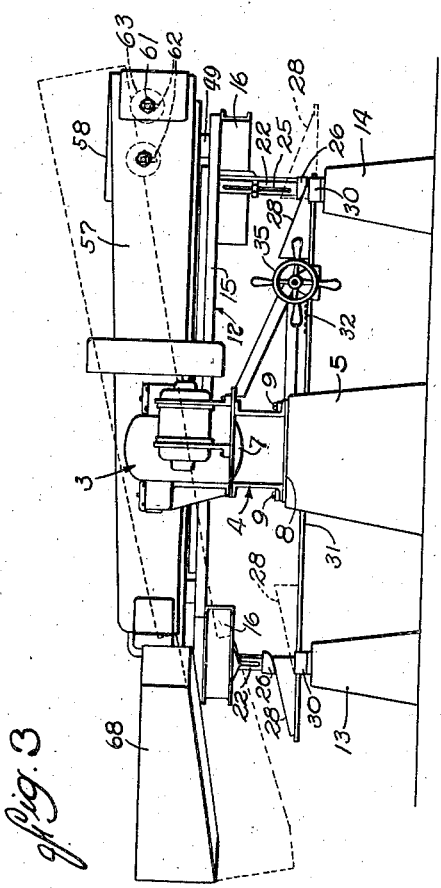

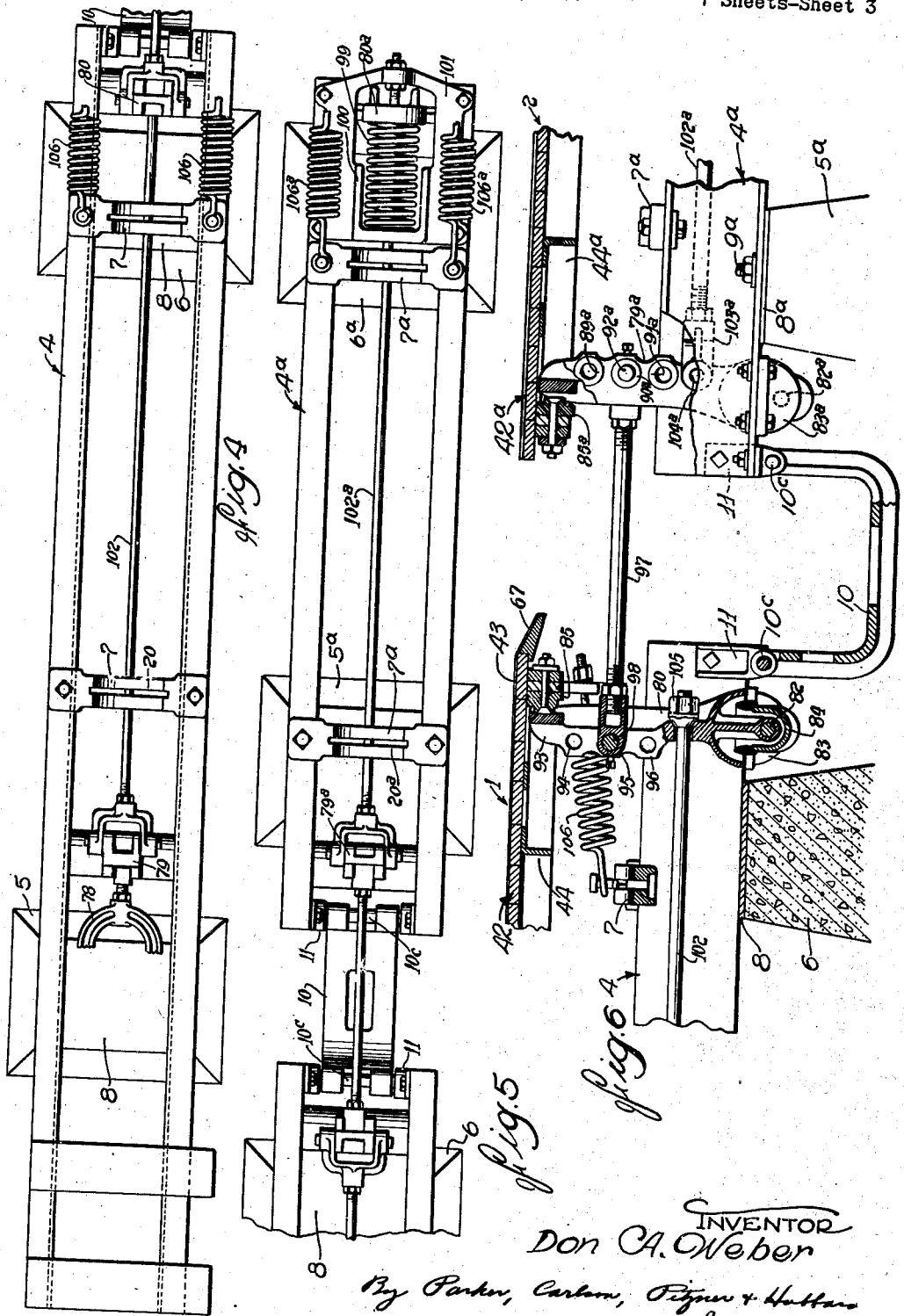

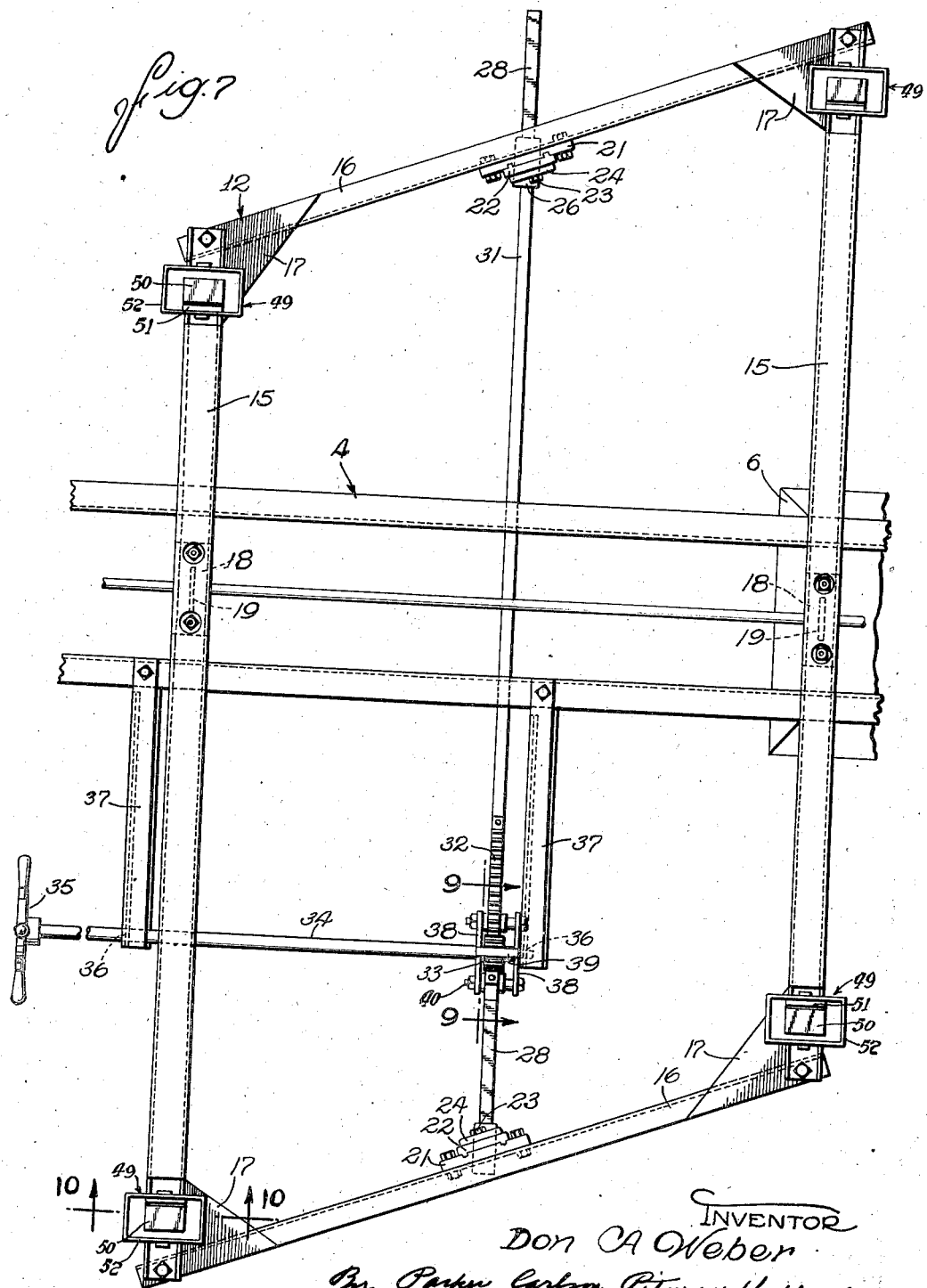

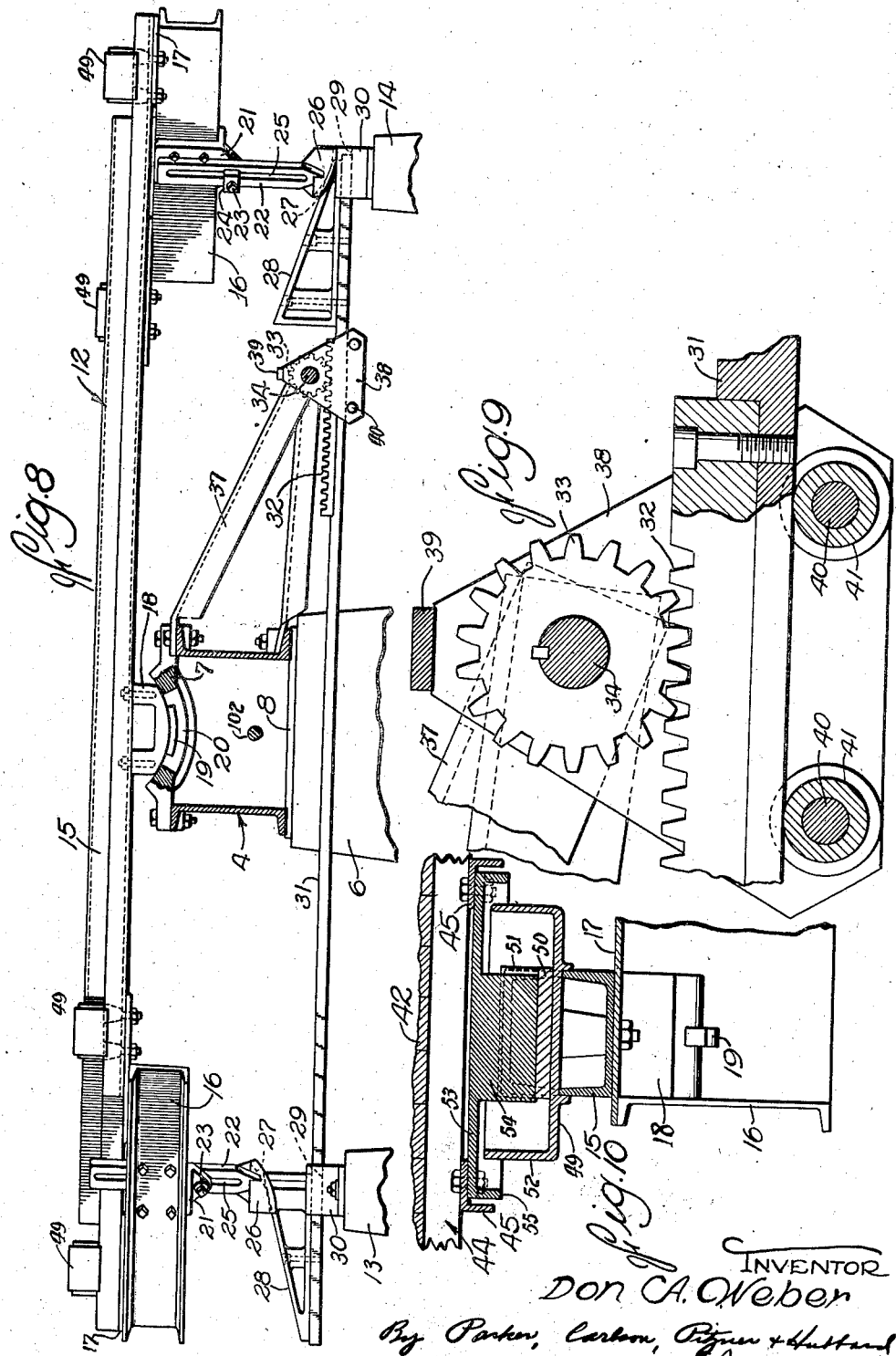

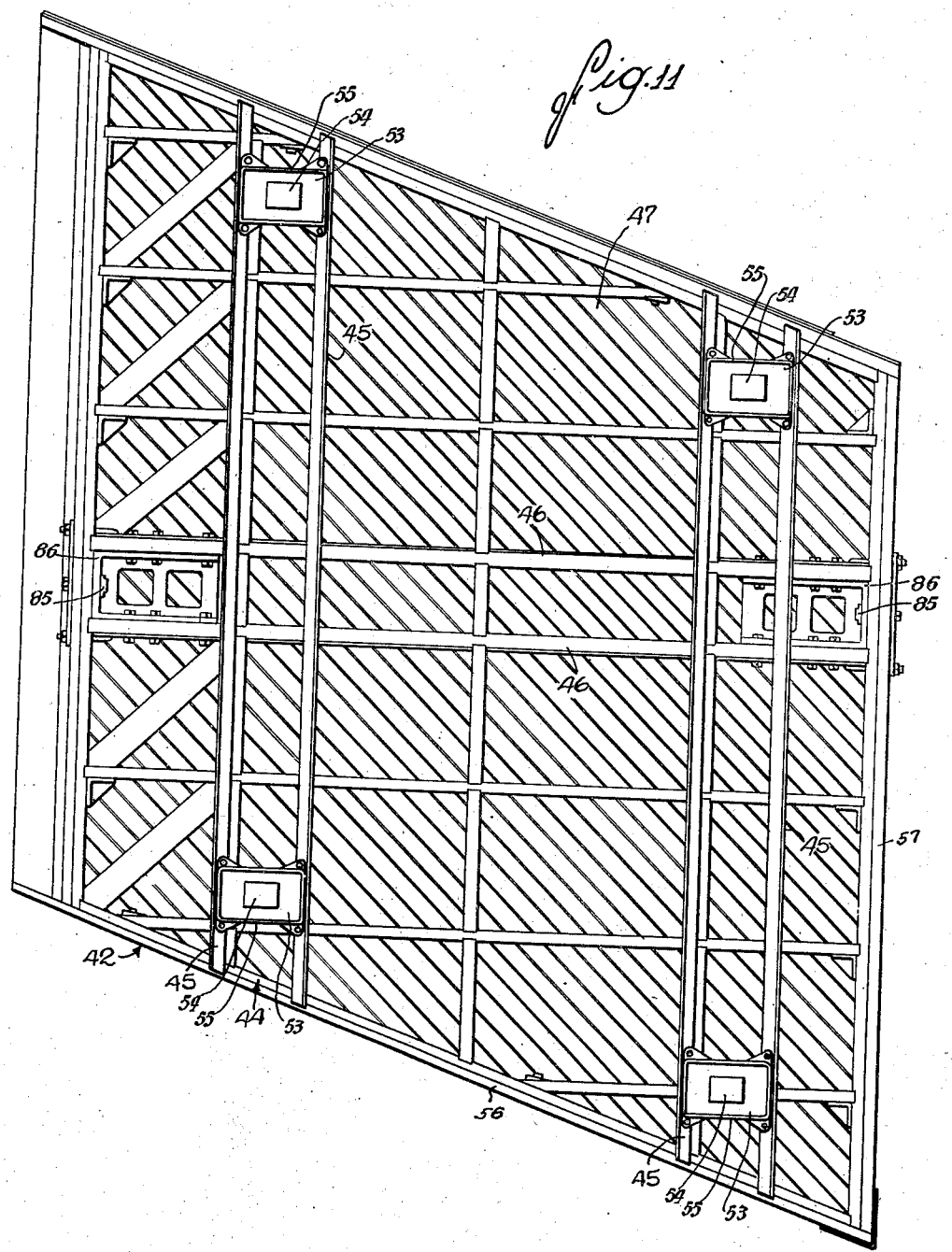

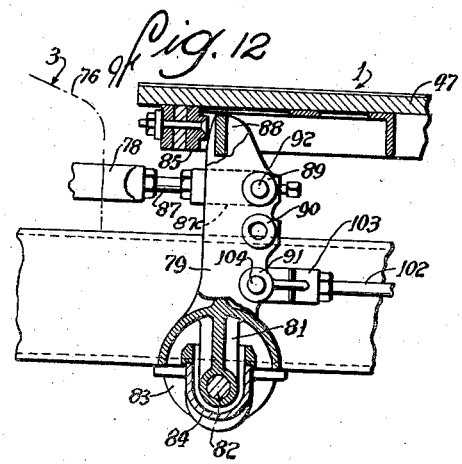
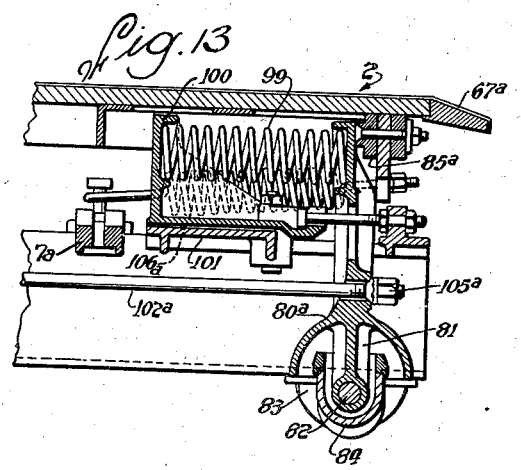
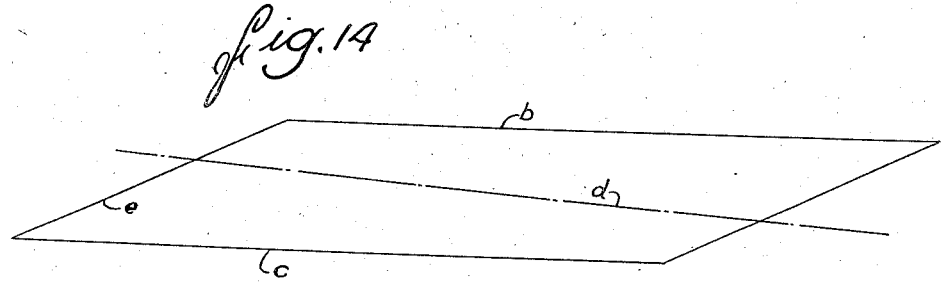
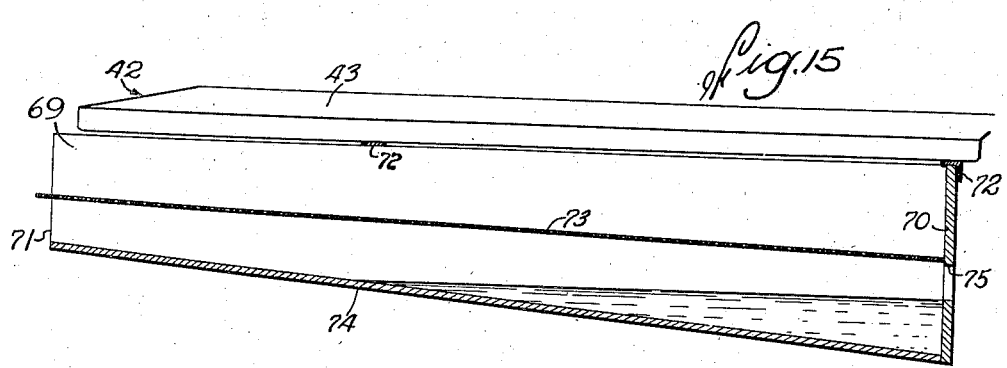

MATERIAL SEPARATING APPARATUS

Don A. Weber, Fort Wayne, Ind., assignor to The Deister Concentrator Company, Fort Wayne, Ind., a corporation of Indiana Application December 6, 1937, Serial No. 178,268

12 Claims. (Cl. 209—441)

The present invention relates to improvements in material separating apparatus, one type of which is commonly exemplified by concentrating tables, and which is adapted for the separation of various kinds of mixed materials, whether granular, fibrous or viscous in character, in accordance with differences in physical characteristics such, for example, as differences in specific gravity, size, shape and/or surface structure, of the component parts of the material mixture.

The primary object of the present invention is to provide a novel material separating apparatus which has a greater separating efficiency and a larger capacity than has heretofore been obtained, so that a smaller treating area or surface is required to obtain a given capacity, and a larger capacity is obtained with a given treating area or surface, than in prior apparatus for the same purpose.

Increasing the rate of feed of the material to the apparatus, and correspondingly increasing the size of a single treating area or surface and hence of the apparatus, to improve the separating efficiency or to increase the capacity, has natural limits dependent on the conditions pertaining to the specific separating problem involved, and beyond which no fruitful results can be satisfactorily and practicably accomplished. An important object of the present invention therefore is to provide a new and useful unitary material separating apparatus comprising, within a given area ordinarily occupied by one treating surface, a plurality of efficient independent treating surfaces, each of which is self-contained, with adjusting means, material supply means, means for supplying a suitable floative medium by which the material is suspended, stratified and conveyed during the separating operation, and means for discharging the separated or processed material, whereby the capacity and over-all efficiency of the apparatus are materially improved.

Another object is to provide a new and improved unitary material separating or treating apparatus in which a plurality of independent self-contained treating units are actuated jointly from a basic motion-creating mechanism, but with independent selective effect or motion characteristics.

A more specific object is to provide a novel apparatus of the last-mentioned character in which the plurality of treating units is operatively associated with the single actuating mechanism for adjustment independently of each other, for example, as to length of stroke and degree of slope both longitudinally and laterally of each treating surface, whereby the effect of the basic motion on each unit may be modified to obtain a particular action without influencing any other unit, and the various units may have different distinctive motion characteristics adapting them respectively for the efficient handling of different kinds and conditions of material.

Still another object is to provide a new and improved apparatus of the foregoing character in which the single actuating mechanism is adapted to impart a characteristic reciprocatory movement through the application of a substantially straight-line force to each of the independently adjustable and independently functioning treating surfaces, regardless of differences in the respective motion characteristics.

A further object is to provide a novel material treating apparatus of the foregoing character in which the successive treating units are flexibly connected, without however interfering with their independent adjustment and operation, to provide an under structure of a strength and rigidity adequate for the support requirements and the operating stresses, so that the characteristic motion required for efficient operation is accurately and fully translated and transmitted to each of the successive treating surfaces.

Another object is to provide each of the plurality of treating surfaces with a separate support comprising a base frame mounted for tilting adjustment endwise of the apparatus, and a subframe cradled on the base frame for tilting adjustment sidewise of the apparatus, whereby each of the successive assemblies may be adjusted separately for end elevation and independently thereof for side inclination, regardless of the corresponding adjustments of the other assemblies.

A more specific object is to provide each of the treating units with a novel treating surface having a general shape or outline such that, when adjusted for the end elevation and side tilt required for the most efficient operation on the material being treated, the discharge side or edge will extend diagonally of the longitudinal center line of the apparatus and will lie in a horizontal plane.

Still another object is to provide novel means for feeding the material to be treated evenly to each of the treating surfaces regardless of the adjustments for end elevation and side tilt.

A further object resides in the provision of new and improved launders which are mounted on each treating surface for movement therewith and in position to receive the material discharging therefrom, and which are selectively operable either to separate or size the discharged material and convey the sized fractions separately to final disposal points, or to size, dewater and convey the material to a disposal point at one end of the treating surface.

Other objects and advantages of the invention will become apparent as the description proceeds.

In the accompanying drawings

Figure 1 is a plan view of a material treating apparatus embodying the features of my invention.

Fig. 2 is a rear side elevational view of the apparatus.

Fig. 3 is a head end elevational view.

Fig. 4 is a plan view of the base frame and actuating mechanism for the head end treating unit.

Fig. 5 is a plan view of the base frame and the actuating mechanism for the spring end treating unit.

Fig. 6 is an enlarged fragmentary view partially in vertical section along line 6—6 of Fig. 1, and illustrating the connection between two successive treating units.

Fig. 7 is a plan view of a subframe for one of the treating units.

Fig. 8 is a transverse vertical sectional view taken along line 8—8 of Fig. 2, and illustrating the subframe for one of the units and the means for adjusting said subframe for side tilt.

Fig. 9 is an enlarged fragmentary sectional view taken along line 9—9 of Fig. 7.

Fig. 10 is a detailed vertical sectional view taken along line 10—10 of Fig. 7, and illustrating one of the bearing supports for one of the treating surfaces.

Fig. 11 is a bottom view of one of the reciprocable decks defining the treating surfaces.

Fig. 12 is a fragmentary longitudinal vertical sectional view of a part of the head end of the apparatus.

Fig. 13 is a fragmentary longitudinal vertical sectional view of the spring end of the apparatus.

Fig. 14 is a diagrammatic representation of the contour and adjustment of one of the treating surfaces.

Fig. 15 is a longitudinal vertical sectional view of a modified launder for handling the discharged material.

Referring more particularly to the drawings, the features of the invention are applicable to apparatus for performing various kinds and types of material treating operations, and are particularly adapted for use and hence illustrated in connection with apparatus of the type exemplified by concentrating tables for separation of the component parts of a material mixture by a concentration process.

The apparatus may be utilized for the separation of various kinds of mixed materials, for example, granular, pulped, fibrous or viscous in character, in accordance with differences in the physical characteristics of the component ingredients, such as differences in specific gravity, size, shape and/or surface structure. Any suitable floative medium, such as liquid, air or other gaseous fluid, best adapted for each specific problem, may be employed. The material treating apparatus constituting the exemplary embodiment of the invention operates under wet specific gravity principles. Thus, water is used as the floative medium, being supplied in part with the material to feed the latter hydraulically to the treating surface, and in part as a dressing to assist in suspending, stratifying, separating and conveying the material in the course of treatment.

In its preferred embodiment, the apparatus comprises a plurality of independently operable and separately adjustable treating units, for example, two units 1 and 2, motivated jointly with the same or selectively distinctive motion characteristics from a single actuating mechanism 3. Preferably, the units 1 and 2 are flexibly interconnected and aligned longitudinally of the machine for support on center and outboard foundation piers, and for convenience are designated respectively as first and second units.

The two units herein disclosed are substantially alike in construction, and hence a description of one will suffice for both, the corresponding parts of the other being identified by the same reference numerals plus the letter a.

Referring to Figs. 1 to 13, the treating unit 1 comprises a longitudinal base frame 4 which is rigidly mounted at opposite ends on upright foundation piers 5 and 6. The frame 4a is generally longitudinally aligned with the frame 4, and is mounted on similar piers 5a and 6a. Preferably, the frame 4 is constructed of two spaced parallel channels disposed on edge with the legs projecting outwardly, and rigidly connected and cross braced by suitably spaced cradle seats 7 at the top and longitudinally spaced sole plates 8 at the bottom resting on the piers 5 and 6. Various parts of the actuating mechanism 3 provide additional cross bracing as will be apparent hereinafter.

The frame 4, with the sole plates 8, is removably anchored to the piers 5 and 6 as by means of bolts 9, thereby permitting assembly adjustment for end elevation. More particularly, the right end of the frame 4 may be raised, as by means of a shim, wedge or jack (not shown) and then bolted rigidly in position to obtain any desired end elevation necessary for most efficient operation. The adjacent ends of the frames 4 and 4a are flexibly connected to provide interrigidity in a horizontal plane, but permitting relative vertical adjustment. In the present instance, the flexible connection consists of an upwardly opening rigid U-shaped link or yoke 10 which is pivoted at its upper ends by means of pins 10c to suitable depending brackets 11 on the ends of the frame channels.

A subframe 12, extending transversely of the main frame 4, is adjustably mounted for side tilt on the cradle seats 7, and is additionally supported at the overhanging ends by outboard foundation piers 13 and 14. The subframe 12 may have any suitable form adapted for the treating surface, and in the present instance is shown as rhomboidal in shape. Preferably, the tilting subframe 12 is constructed of two parallel cross frame members 15 extending perpendicularly to the base frame 4, and two parallel side frame members 16 extending diagonally of the base frame. These frame members are rigidly bolted together at the ends, and gusset plates 17 are interposed therebetween to brace the joints. The side frame members 16 may consist of heavy upright channels, and the cross frame members 15 may consist of upwardly facing horizontal channels resting at the ends on the members 16 and somewhat shorter downwardly facing channels superimposed thereon.

Suitable cradles 18 are rigidly attached to intermediate portions of the undersides of the cross frame members for rocking engagement with the cradle seats 7. The bearing faces of the seats 7 and cradles 18 are arcuate about an overhead axis substantially parallel in a vertical plane to the center line of the base frame 4 and coincident with the line of applied forces operating the deck. Each cradle 18 has a tongue 19 engaging in a slot 20 in the associated seat 7 to prevent relative shifting or displacement longitudinally of the pivotal axis.

The adjustable outboard supports for the subframe 12 may be of any suitable construction. In the present instance, each comprises a bracket 21 bolted to the inner face of the associated side frame member 16 and a vertical tilting post 22 adjustably clamped to the bracket between the bracket bolts by means of a bolt 23 and clamp plate 24. The bolt 23 extends through a longitudinal slot 25 in the post 22 and the latter is vertically splined to the bracket to prevent relative pivotal movement. It will be evident that the tilting post 22 is vertically adjustable on the bracket 21 as required to determine the initial height setting, to compensate for wear, and to provide for adjustment of the range of side tilt. A shoe 26 is rigid with the lower end of the tilting post 22, and is formed with a curved groove 27 slidably engaging the upper inclined face of a wedge 28 adapted for adjustment transversely of the cradle axis. The lower face of the wedge 28 is slidably supported in a horizontal groove 29 in a guide block 30 mounted on the associated foundation pier 13 or 14 directly beneath the shoe 26. It will be seen that adjustment of the wedge 28 in opposite directions will respectively elevate and lower the post 22 to tilt the subframe 12.

The two wedges 28 for the opposite sides of the subframe 12 have reversely inclined adjusting faces and are rigidly interconnected for simultaneous adjustment. Upon adjustment of the wedge assembly in either direction the wedge with the ascending face will elevate one side of the subframe 12 and the other wedge will permit lowering of the other frame side. Hence, both sides of the subframe 12 are supported in all positions of adjustment. In the preferred form, the wedges 28 are secured to opposite ends of an operating bar or rod 31 extending transversely of the apparatus below the base frame 4.

To provide suitable actuating means a longitudinal gear rack 32 is inset in and bolted to the top of the bar 31, and meshes with a pinion 33 fixed on a shaft 34 extending to the head end of the unit 1 and there provided with a handwheel 35. Opposite ends of the shaft 34 are journaled in suitable bearings 36 respectively in two brackets 37 supported from and spaced longitudinally of the base frame 4. Preferably, each bracket 37 consists of two angle irons connected at their free ends, and bolted at their opposite ends respectively to the flanges of one of the side channels of the base frame 4. The rack 32 and pinion 33 are held together to insure correct meshing engagement and smooth operation, and the means for this purpose consists of two spaced triangular pendant members 38 suspended from the shaft 34 and rigidly connected by a spanner bar 39 at the top and two tie bolts 40 at the lower corners. Rollers 41 are mounted on the bolts 40 and provide an antifriction support or guide for the bottom of the rack bar 31.

The subframe 12 supports a deck 42 reciprocable longitudinally of the base frame 4 and defining a suitable material treating surface 43. Within certain aspects of the invention, the deck 42 is not limited to any particular shape or construction, but may be provided in various forms and types. The deck 42, and hence the treating surface, is herein shown, for purposes of illustration, as diagonal or rhomboidal in outline, which is of specific advantage, but the multiple-surface principle is also applicable to decks of other shapes, for example, rectangular decks. Under normal operating conditions with side tilt the material supplied to the upper diagonal corner of the deck 42 takes a natural oblique course in spreading and stratifying on the surface 43. This course follows the component of the acting forces resulting from the reciprocatory motion, the gravity force acting sidewise due to the tilt of the deck, and the application of water and other floative agent. The rhomboidal deck conforms closely to the oblique spread of the material and hence provides a highly efficient treating surface.

The adjustment of the deck 42 to the proper end elevation and side tilt for optimum performance is determined by the particular requirements and conditions of each separating or treating problem. For example, the correct adjustment for a granular material is influenced by the characteristics of the material, such as the gravity, size and shape of the mixed particles, by the rate of feed desired and by the results to be obtained. The diagonal or angular limiting side edges $b$ and $c$ of the deck 42 (see Fig. 14) preferably are inclined to the center line $d$ at such an angle that they are substantially level or horizontal. With the upper diagonal edge $b$ horizontal, the feed and water distribution will be more uniform and effective under natural influences. Similarly, with the lower diagonal edge $c$ horizontal, the separated material will discharge more uniformly under natural influences without any tendency of unnatural crowding or lateral forcing.

The deck 42 may be fabricated of any suitable material and in the present instance comprises an underframe 44 including two sets of parallel cross stringers 45 adjacent opposite ends and main longitudinal stringers 46 covered with diagonally placed floor members 47 rendering the structure self-bracing. The top or treating surface 43 of the deck 42 may be formed with suitable parallel riffles 48 extending longitudinally of and parallel to the center line. The rhomboidal shape of the deck 42 permits the use of an unusually large number of efficient riffles 48. To provide a slidable support for the deck 42 four slide bearing boxes 49 are rigidly fixed on the top of the subframe 12 respectively on and adjacent the end of the parallel cross frame members 15. Each of the bearing boxes 49 has a longitudinal guideway with flat horizontal and vertical bearing surfaces 50 and 51 and an upwardly opening cup 52 extending about the guideway and adapted to contain oil up to a predetermined level above said bearing surfaces. Four similarly arranged slide bearings 53 are rigidly attached respectively to the ends of the two sets of parallel cross stringers 45 and engage with the bearing boxes 49 for reciprocation longitudinally of the base frame 4. Each slide bearing has a downwardly projecting rectangular guide or shoe 54 engaging the guideway of the associated bearing box 49, and also has a depending wall 55 extending freely about the associated cup 52. Suitable oil grooves (not shown) may be provided in the bearing surfaces of the shoes 54. The horizontal bearing surfaces 50 of the various boxes 49 serve to support the deck 42 and the vertical surfaces 51 maintain alignment and also provide support against lateral movement when the deck is adjusted for side tilt. It will be understood that the bearing boxes 49 are constructed of sufficient length to accommodate any normally required length of reciprocation. The oil cup 52 projects upwardly into the wall 55 so that the parts provide an enclosure that is substantially proof against the entry of dust, water and other foreign matter.

The deck 42 is provided with an upright side board 56 at the back edge, and an upright head end board 57. Mounted on the upper corner of the deck 42, which herein is the rear left hand corner and is conveniently designated as the "feed corner," is a suitable feed box 58. In the present instance, this box is spaced slightly from the board 56, and is closed at the ends, sides and bottom but open at the top. A longitudinal slot 59 is formed in the back wall at the bottom of the box 58, and is adapted to permit the material to drop onto the deck 42 at a proper rate.

The feed box 58 is supported for pivotal adjustment so that the slot 59 can be secured in a horizontal position or different desired positions of endwise inclination, regardless of the end elevation of the deck 42, and thereby be adapted to discharge the material uniformly and under a constant static head along its entire length. Thus, both sides of the box 58 adjacent the innermost end are pivoted on a bolt 60 anchored in and projecting forwardly from the side board 56. Two horizontally spaced bolts 61 extend through the head board 57 and through two vertical slots 62 in the adjacent end of the feed box 58, and are available to clamp the latter securely in position of adjustment. Suitable washers 63 on the bolts 61 serve to close the slots 62 against the escape of material.

The material to be supplied to the feed box 58 may be mixed with water to provide a hydraulic feed. Additional dressing water is supplied to the treating surface 43 from a launder 64 extending from the feed box 58 along the rear side board 56. In the present instance, the launder 64 consists of a box rigidly mounted on and in slightly spaced relation to the board 56. The box 64 has a service entry 65, and is open at the long back side facing the board 56. A plurality of diamond-shaped blocks 66 are pivotally mounted in a longitudinal series along the discharge edge of the box 64, and constitute means for adjusting the flow and distribution of dressing water to the treating surface 43.

The relatively heavy treated material is discharged from the elevated end edge e of the deck 42 onto a suitable discharge apron 67. The relatively light treated material is discharged from the front side edge of the deck 42 into a launder 68 which may be of any suitable character and which is adapted to convey the material to a final disposal point. In Figs. 1 to 3, the launder 68 consists of an elongated box which is secured to the deck 42 for adjustment and movement therewith, and which is closed except at the top and one end. The receiving edge of the box 68 is substantially coextensive in length with the front side discharge edge or lip of the treating surface 43, and extends in the same direction. Preferably, the open end of the launder 68 is located adjacent the apron 67, and the bottom wall is inclined downwardly thereto so as to obtain a rapid discharge of the treated material by sluicing of the accompanying water.

A modified form of receiving launder 69, adapted to dewater and further separate the treated material, is illustrated in Fig. 15. The launder 69 consists of an elongated box which has an end wall 70 adjacent the head board 57 of the deck 42, and which has a material discharge opening 71 at the other end. Suitable angle bar brackets 72 attached to the underside of the deck 42 serve to support the launder 69. Rigidly mounted within the launder 69 and coextensive in length and width therewith is an intermediate sizing element, preferably in the form of a flat perforated plate 73 spaced above the bottom wall 74. The plate 73 may be horizontal or slightly inclined upwardly toward the discharge end 71, and may extend beyond the latter for convenient attachment of material take-off connections (not shown). It will be understood that the screening medium separates the coarser particles out of the material discharged from the front edge of the deck 42, and permits the water and the finer particles to pass therethrough and collect in the bottom of the launder 69. The dewatered coarse particles are conveyed along the plate 73 to the discharge opening 71 for collection at a disposal point as a result of the differential stroke of the deck 42. The bottom wall 74 of the launder 68 is inclined upwardly from the end wall 70 to the discharge opening 71 at a pronounced angle so as to provide a settling chamber for the finer particles of the material. An opening 75 in the end wall 70 above the bottom wall 74 provides a water overflow outlet. The opening 75 is located to maintain a predetermined water level below the material discharge opening 71, but providing a depth sufficient to effect quick settling of the solid particles and the overflow of clean water. The settled material is conveyed through the water along the bottom wall 74 as a result of the differential stroke of the deck 42, and ultimately is discharged in a dewatered condition through the lower portion of the opening 71 for collection at a disposal point.

The unitary actuating mechanism 3 comprises a head motion device 76 which is adapted to be driven from a suitable source of power, such as an electric motor 77, and which is conveniently mounted on a head end extension of the base frame 4. The device 76 has an outlet element, in the form of a yoke 78 through which it transmits a characteristic reciprocatory stroke adjustable as to length and differential action.

The action of the motion device 76 is transmitted to the deck 42 through two rockers 79 and 80. Each of these rockers preferably is in the form of a vertical lever with a bearing 81 at the lower end pivoted on a cross pin 82. The ends of the pin 82 are supported in a bracket 83 which is secured to and spans the underside of the channels of the base frame 4, and which is formed integral with a reservoir 84 adapted to contain a lubricant for the bearing surfaces. At the upper ends the rockers 79 and 80 are adapted respectively for engagement with removable wearing bosses 85 mounted respectively in pull boxes 86 secured to the underside of the opposite ends of the deck 42.

The rocker 79 is located at the head end of the treating unit 1, and is connected to the yoke 78 of the motion device 76 by an adjustable connecting rod or stud 87 for operative engagement with the wearing boss 85 to pull the deck 42 through the return stroke toward the motion device. Preferably, the rocker 79 is formed with a vertical slot 88, and with three sets of bosses 89, 90 and 91 in opposite sides of the slot and located at different distances from the pivotal axis 82. The connecting rod 87 is adjustably threaded at one end into the yoke 78, and at the other end into a cross head 87c. This cross head fits into the slot 88, and is therein pivotally connected to the rocker 79 by means of a pin 92 selectively inserted and clamped in one of the sets of bosses 89, 90 and 91. By this means, the stroke of the rocker and length of the deck reciprocation may be varied as desired in relation to the characteristic motion of the device 76, and hence in addition to the variations afforded by the usual adjustments provided in the device.

The rocker 80 is located at the other end of the treating unit 1 and is adapted for operative engagement upon movement to the right with the associated wearing boss 85 to move the deck 42 through the forward stroke as permitted or exacted by the motion device 76. As in the case of the rocker 79, the rocker 80 is formed with a vertical slot 93 and with three sets of bosses 94, 95 and 96 located at different distances from the pivotal axis.

The rocker 80 is adapted to transmit the pull of the device 76 to the succeeding unit, for example, the unit 2. Thus, an adjustable connecting rod 97 is pivotally connected at one end to the rocker 80 by means of a pin 98 inserted and clamped selectively in any one of the sets of bosses 94, 95 or 96, and at the other end to the rocker 79a by means of a pin 92a inserted and clamped selectively in any one of the sets of bosses 89a, 90a or 91a.

By shifting the connecting pins 98 and 92a into different positions relative to the pivotal axes of the associated rockers, the same or different motion characteristics may be imparted to the successive decks 42 and 42a from the single motion device 76. For example, with the adjustment as shown in Fig. 6, both decks will have strokes of the same length. However, if the pin 98 is shifted to the bosses 96 and the pin 92a is shifted to the bosses 89a, the stroke of the deck 42a will be less than that of the deck 42. Conversely, if the pins 98 and 92a are shifted respectively to the bosses 94 and 91a, the stroke of the deck 42a will be longer than that of the deck 42. It will be evident that numerous intermediate adjustments may be effected.

When a succeeding unit is an intermediate unit of the apparatus, it is exactly like the unit 1 except for the extension of the base frame 4 in the latter to support the motion device 76. When, as herein shown, the succeeding unit is the last or final unit of the series, the right end rocker 80a is somewhat different in construction. Thus, the rocker 80a is urged toward the right by a heavy coil compression spring 99 in opposition to the return pull of the motion device 76. The fixed end of the spring 99 engages a seat 100 on a supporting bracket 101 bolted to the base frame 4a for sliding adjustment to vary the spring tension.

The action of the spring 99 is suitably transmitted to all of the treating units, and provides a resilient force for effecting the advance stroke as permitted by the motion device 76. Preferably, the rockers of each unit are mechanically interconnected so as to transmit the pull of the motion device 76 and the pressure of the spring 99 from one rocker to the other directly instead of through the associated deck. The means for this purpose consists of a rod 102 adjustably threaded at one end into a cross head 103 pivotally connected by a pin 104 to the rocker 79. The other end of the rod 102 extends through the rocker 80, and has a nut 105 threaded thereon and in universal bearing engagement with the rocker. The pull of the motion device 76 is applied longitudinally of the apparatus through the rocker 79, the rod 102, the rocker 80, the rod 97, the rocker 79a, and the rod 102a to the rocker 80a, and the decks 42 and 42a merely rest on the bearing boxes 49 and 49a for reciprocation in response to the oscillation of the rockers.

It will be evident that the spacing of the contact faces of each set of rockers may be adjusted into the desired relation to that of the associated wearing bosses. If the spacing of the faces and bosses were the same, the associated deck would move as a unit with the actuating rockers. If, as shown, the spacing of the contact faces of the rockers is less than that of the associated wearing bosses, an adjustable lost motion or play is obtained between the deck and the actuating mechanism. In taking up the lost motion, a jarring or bumping action, advantageous to the treating operation, is imparted to the deck. In many instances, it is desirable to utilize a jarring action only at one end of the reciprocation, for example, at the start of each return stroke. To this end, a plurality of coiled tension springs 106 are anchored at opposite ends respectively to the base frame 4 and the right hand puller box 86, and tend to maintain the deck 42 in engagement with the rocker 80. With the play substantially confined to the head end, the rocker 79 will pick up the deck 42 with a jar at the start of the return stroke. The springs 106 will take up any play between the rocker 80 and the deck 42 substantially simultaneously with the termination of the return stroke. Hence, the deck 42, on its succeeding forward stroke, will start without a jar, and will move smoothly and accelerate in accordance with the differential action of the motion device 76.

It will be evident that I have provided a novel material treating apparatus which is highly efficient and has a large capacity for a given size. By providing a plurality of treating surfaces in one apparatus with a single actuating mechanism, multiplication of parts is reduced to a minimum. When the treating units are supported separately, as herein disclosed, each unit may be adjusted independently of and without affecting the other, and may be operated with a characteristic motion different than that of the other. In the preferred form, all forces tending to produce the reciprocation of one or more of the decks extend along a substantially straight line substantially coincident with the axis of the cradles.

While the invention has been described in the foregoing as embodied in a unitary apparatus, it will be understood that various individual features and sub-combinations may find useful application without other features or the complete combination. It is understood, therefore, that the employment of such individual features or sub-combinations is contemplated by this invention and within the scope of the appended claims. It is further pointed out that various changes in details of construction may be made within the scope of the appended claims without departing from the spirit of this invention, and that the invention is not limited to the specific details shown and described.

I claim as my invention:

1. A material-treating apparatus of the class described comprising, in combination, a substantially horizontal longitudinal base frame, a subframe mounted on said base frame for lateral tilting adjustment on an axis extending longitudinally of said base frame, a material-treating deck reciprocable on said subframe along said axis, connections to said deck for applying reciprocating forces along a line substantially coincident with said axis to operate said deck, adjusting means operable to tilt said subframe on said axis, a second material-treating deck mounted in tandem relation to said first deck and having mounting means and adjusting means similar to those of said first deck and tiltable on substantially the same axis, resilient-tension applying means associated with said second deck arranged to resist said reciprocating forces, and tension-transmitting connections between said decks constructed and arranged to coordinate the application of said forces and the resistance of said resilient means to oscillate both said decks along said axis.

2. In a material treating apparatus of the class described, in combination, a frame mounted for selective vertical angular adjustments both longitudinally and laterally, a material treating deck mounted on said frame for longitudinal reciprocation, a feed box having a feed-discharge opening extending along the rear edge of said deck to deliver the material thereto, means for leveling said feed box adapted to compensate for different longitudinal angular adjustments of said frame and position said opening in a level plane so as to feed uniformly under a uniform head, and means for clamping said feed box in position of adjustment.

3. In a material treating apparatus of the class described, in combination, a frame mounted for selective longitudinal and transverse adjustments, a material treating deck mounted on said frame for longitudinal reciprocation and having end and side edges, and a launder supported by said deck along the lowermost side edge to receive material discharging therefrom, said launder comprising a box having a bottom wall inclined upwardly toward the uppermost end of said deck, a discharge opening at the upper end of said wall, a water overflow opening at the opposite end and above said wall and below said discharge opening, and an intermediate perforated wall above said bottom wall and inclined upwardly toward said discharge opening.

4. A material treating apparatus comprising, in combination, a longitudinal horizontal base frame, a subframe mounted on said base frame for lateral tilting adjustment, a material treating deck mounted on said subframe for reciprocation longitudinally of said base frame and having oppositely facing abutments at opposite ends, two vertical rockers pivotally mounted on said base frame for engagement respectively with said abutments, a reciprocatory motion creating device connected to one of said rockers, and adjustable connecting rod between said rockers for transmitting the pull of said device from said one rocker to the other rocker, spring means acting on the other rocker in a direction to establish engagement with the associated abutment, said abutments being spaced farther apart than the spacing of said rockers, and spring means acting on said deck in a direction tending to separate said first mentioned rocker and the associated abutment.

5. A material treating apparatus comprising, in combination, a frame, a material treating deck mounted on said frame for longitudinal reciprocation and having oppositely facing impact abutments at opposite ends, two vertical rockers pivotally mounted at their lower ends on said frame for engagement at their upper ends respectively with said abutments, a reciprocatory motion creating device operatively connected to one of said rockers to impart an oscillatory movement thereto, spring means acting on the other rocker in a direction to establish engagement with the associated abutment, and means independent of said deck and adjustably connecting said rockers for joint oscillation.

6. A material treating apparatus comprising, in combination, a frame, a material treating deck mounted on said frame for longitudinal reciprocation and having oppositely facing impact abutments at opposite ends, two vertical rockers pivotally mounted at their lower ends on said frame for engagement at their upper ends respectively with said abutments, a reciprocatory motion creating device operatively connected to one of said rockers to impart an oscillatory movement thereto, spring means acting on the other rocker in a direction to establish engagement with the associated abutment, the spacing of said abutments being greater than that of the upper ends of said rockers.

7. A material treating apparatus comprising, in combination, a frame, a material treating deck mounted on said frame for longitudinal reciprocation and having oppositely facing impact abutments at opposite ends, two vertical rockers pivotally mounted at their lower ends on said frame for engagement at their upper ends respectively with said abutments, a reciprocatory motion creating device operatively connected to one of said rockers to impart an oscillatory movement thereto, spring means acting on the other rocker in a direction to establish engagement with the associated abutment, an adjustable connecting rod limiting the maximum spacing of the upper ends of said rockers and adapting each rocker to transmit a pull to the other rocker respectively upon oscillation in opposite directions, the spacing of said abutments being greater than the maximum spacing of the upper ends of said rockers, and spring means tending to maintain said deck in engagement with the other of said rockers.

8. A material treating apparatus comprising, in combination, a frame, a material treating deck mounted on said frame for longitudinal reciprocation and having oppositely facing abutments at opposite ends, two spaced actuating members mounted on said base frame for engagement respectively with said abutments and adapted in opposite directions of movement respectively to move said deck in the forward and reverse strokes of said reciprocation, a reciprocatory motion creating device connected to one of said members, spring means acting on the other member in a direction to establish engagement with the associated abutment, an adjustable connection between said members limiting the extent of separation thereof and adapting each member to transmit a pull to the other respectively upon movement in opposite direction, the space between said abutments being greater than that between said members, and spring means tending to maintain engagement between said deck and one of said members.

9. A material treating apparatus of the class described comprising, in combination, a plurality of treating units aligned in tandem relation, each unit having a separate horizontal base frame adapted for angular adjustment in a longitudinal vertical plane to obtain different end elevations, a subframe cradled on said base frame for side tilting adjustment, a deck reciprocable on said subframe longitudinally of said base frame, and operating means on said base frame for reciprocating said deck, means flexibly connecting the adjacent ends of said base frames of said units to prevent relative endwise movement while permitting independent vertical adjustment thereof, a motion creating device operatively connected to the operating means for one of said units, and means adjustably interconnecting the operating means of successive units.

10. A material treating apparatus comprising, in combination, a longitudinal substantially horizontal base frame supported for longitudinal tilting adjustment, a subframe mounted on said base frame for lateral tilting adjustment, a material treating deck mounted on said subframe for reciprocation longitudinally of said base frame and having oppositely facing impact abutments at opposite ends, two vertical rockers pivotally mounted at their lower ends on said frame for engagement at their upper ends in opposite directions of movement respectively with said abutments, a reciprocatory motion device operatively connected to one of said rockers to impart an oscillatory movement thereto, means independent of said deck and connecting said rockers for joint oscillation, and means to vary the movement of said rockers between engagements with said abutments.

11. A material treating apparatus comprising, in combination, a frame, a material treating deck mounted on said frame for longitudinal reciprocation and having oppositely facing impact abutments at opposite ends, two actuating members movably mounted on said frame and having impact faces adapted for engagement in opposite directions of movement respectively with said abutments, a reciprocatory motion creating device operatively connected to one of said actuating members to impart a reciprocatory movement thereto, and means independent of said deck and interconnecting said members for joint movement, the spacing of said abutments being greater than that of said impact faces.

12. A material treating apparatus comprising, in combination, a frame, a material treating deck mounted on said frame for longitudinal reciprocation and having oppositely facing impact abutments at opposite ends, two actuating members movably mounted on said frame and having impact faces adapted for engagement in opposite directions of movement respectively with said abutments, a reciprocatory motion creating device operatively connected to one of said actuating members to impart a reciprocatory movement thereto, and means independent of said deck and interconnecting said members for joint movement.

DON A. WEBER.